June 4, 1929.  P. H. THOMAS  1,715,479
TRANSMISSION LINE TOWER
Filed Nov. 5, 1925   3 Sheets-Sheet 1

WITNESSES
Harold W Cano
D. Holmes

INVENTOR
Percy H. Thomas

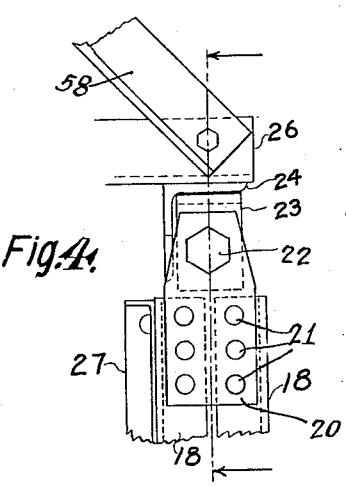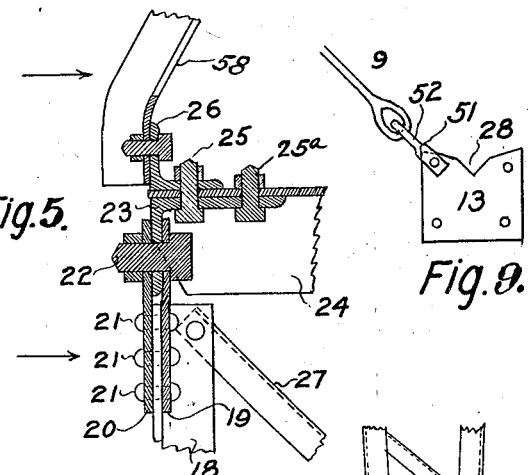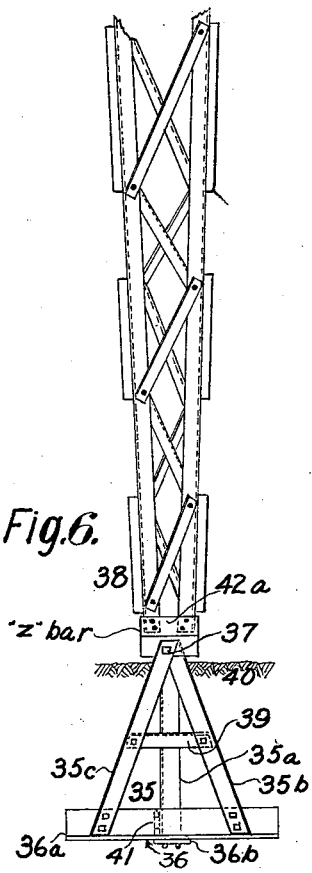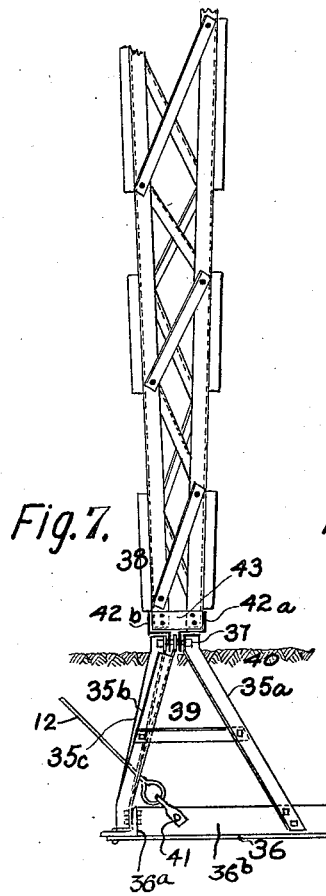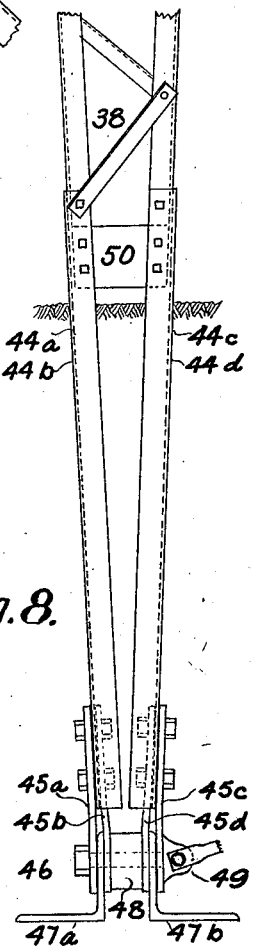

June 4, 1929.   P. H. THOMAS   1,715,479
TRANSMISSION LINE TOWER
Filed Nov. 5, 1925    3 Sheets-Sheet 3
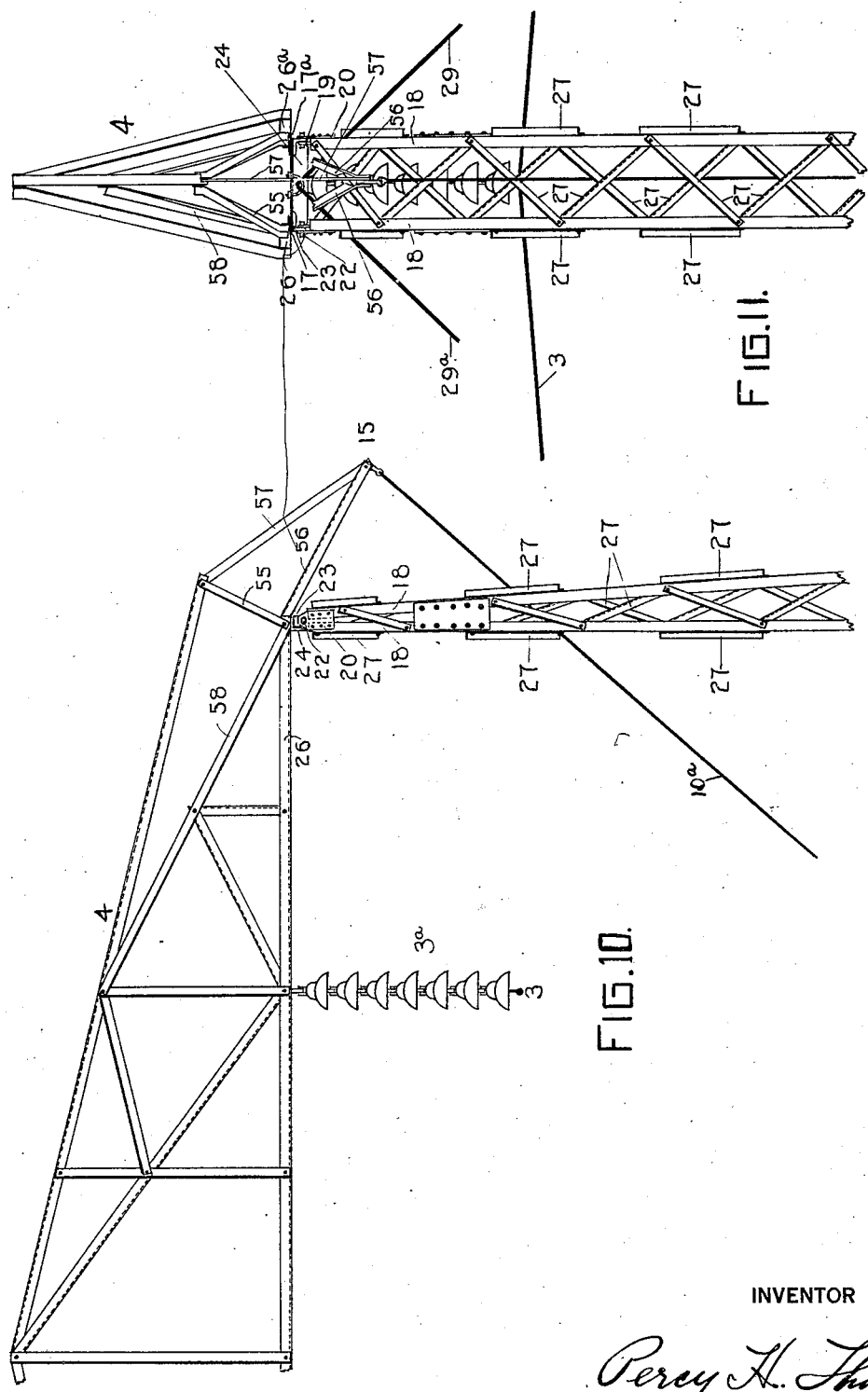
INVENTOR
Percy H. Thomas Patented June 4, 1929.

1,715,479

UNITED STATES PATENT OFFICE.

PERCY H. THOMAS, OF UPPER MONTCLAIR, NEW JERSEY.

TRANSMISSION-LINE TOWER.

Application filed November 5, 1925. Serial No. 67,159.

My invention relates to the type of structures used in supporting high tension conductors for electric power transmission and more particularly to structures usually called towers built up of rigid material such as structural steel shapes. Such conductors necessarily traverse the open country for long distances and must be, therefore, strong and reliable, as well as of low cost.

In an application filed October 10th, 1925, Serial No. 61,752, entitled Improvement in transmission towers for electric circuits, I have shown a number of steel towers for transmission lines, which are adapted to serve under much the same conditions as the towers described herein. There are many improvements and special devices described in that application which may often be used to advantage in the constructions described in this application.

The towers shown herein are particularly adapted for use on uneven ground and are particularly rugged in case of accident. I show also certain foundations well adapted to these and other towers as well as certain novel details of construction.

Fig. 1 is an elevation looking along the line showing my tower on a site sloping across the line, the ground wires and longitudinal guys shown in Fig. 3 being omitted. Fig. 2 is a sectional end view looking toward post 5 from between the posts of the same tower; only the post 5 and a portion of the crossarm being shown, and the insulators and conductors and ground wires of Fig. 3 being omitted. Fig. 3 is a plan of the tower of Figs. 1 and 2, the transverse guys being omitted. Fig. 1$^a$ is an elevation looking along the line showing a modified form of the tower of Fig. 1 adapted to ground sloping across the line. The longitudinal guys are omitted. Fig. 4 is an elevation taken in the direction of the line of a detail suitable for use with my towers, being a pivot joint for connecting the top of the post to the crossarm. For the sake of simplicity several of the structural elements shown in other figures are omitted in Fig. 4. Fig. 5 is a sectional elevation of the joint of Fig. 4 taken at the section line shown therein looking across the line.

Fig. 6 is a detail elevation of one type of foundation and of the bottom of the post 6 of the tower of Figs. 1 and 3 and is taken looking across the line and from a point between the two posts, the transverse guy shown in Fig. 7 being omitted for clearness.

Fig. 7 is an elevation of Fig. 6 taken looking along the line in the same direction as in Fig. 1. Fig. 8 shows in elevation an alternative type of foundation and is taken looking along the line as at post 5 in Fig. 1.

Figure 1:
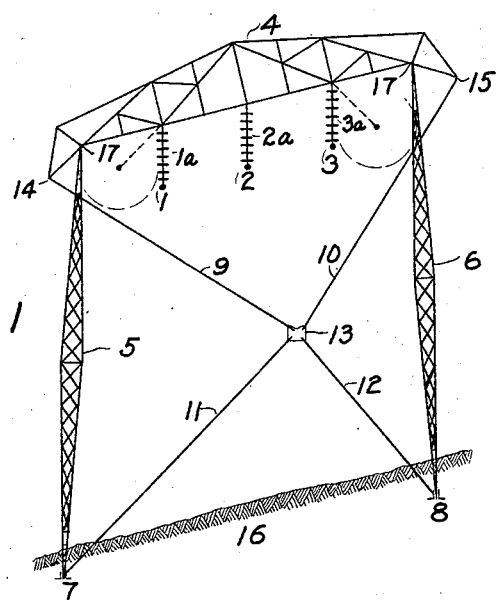

Fig. 9 is an elevation of an alternative construction for the equalizer 13 of Fig. 1, looking along the line, showing certain details, the guys 10, 11 and 12 being omitted. Fig. 10 is an elevation of a portion of the right hand half of the tower of Fig. 1$^a$, looking along the line as in this figure, illustrating one construction for the flexible connection between the post and the crossarm, this being the detail shown in Figs. 4 and 5. The longtudinal guys are omitted in this figure. Fig. 11 is a side elevation of Fig. 10, looking across the line as in Fig. 5. The members 56 are partly broken away to show parts behind. Certain crossarm members shown in Fig. 10 are omitted in Fig. 11.

In Fig. 1, I show the elevation of a universal tower looking along the direction of the line. The tower supports three electrical conductors 1, 2, 3 by means of three insulator strings 1$^a$, 2$^a$, 3$^a$. These insulator strings are hung from a rigid crossarm 4, which in turn is supported by two posts or columns, 5 and 6, resting on foundations 7 and 8. This structure is secured against horizontal stresses in a transverse direction by a system of transverse guys, 9, 10, 11, 12, the guys 9 and 10 being secured respectively to extensions 14 and 15 of the crossarm 4 and to the central plate or equalizer 13. The guys 11 and 12 are also connected to the plate or equalizer 13 and to foundations in the ground on opposite sides of the tower. It may be convenient to connect these guys to the foundations 7 and 8 which carry the posts 5 and 6, but this is not necessary. In fact it is sometimes advantageous to anchor these guys at points outside the tower posts, as this will reduce the uplift produced by transverse wind stress on the tower. The general contour of the ground level is taken here as having a slope of 1 in 4.5 downward to the left. However, this tower is appropriate for use on greater or lesser slopes or on level ground or on slopes in the other direction, across the line. For this purpose the joint between the top of the posts 5 and 6 and the crossarm is made flexible or hinged as shown at 17, 17, to permit the crossarm to assume the position appropriate to the slope of the ground. A suitable detail of construction for securing this hinged or flexible connection is shown in Figs. 4 and 5. It is here assumed that the post is framed of four angles arranged on the corners of a square and held in relative position by latticing. Two of these angles are shown at 18, these being the two front angles of the post 6 for example looking at Fig. 1. The position of these angles is shown in Figs. 10 and 11, the two front angles 18 as shown in Fig. 10 being connected through the plates 19 and 20 and the bolt 22 and other members to the crossarm member 26 at the point 17, this member 26 being shown also in Fig. 11. Similarly with the two other corner angles of the post which are connected to the member 26ª at the point 17ª, Fig. 11. Referring again to Figs. 5 and 6 it will be noted that on the longitudinal face of the post at the top is a plate 20 and on the inside a similar plate 19—both plates being secured by rivets 21 to the angles 18 as shown. Both plates 19 and 20 extend above the angles 18 and engage both sides of the bent plate 23. The bolt or pin 22 passes through the plates 19 and 20 and the vertical portion of the bent plate 23 and serves as the hinge for the two angles 18 and constitutes the flexible connection called for at 17. 24 is an angle running between the front and back of the post, connecting 17 and 17ª. 26 is one of the bottom members of the crossarm 4, these angles 24 and 26 being secured to the bent plate 23 by the bolts 25, 25ª. The angles 27, 58 are typical auxiliary bracing, playing no part in the hinged connection at 17 and 17ª.

With changes in the relative angles of the post and the crossarm 4 with change in the ground slope, the plates 19 and 20 merely swing around the pin or bolt 22 in the bent plate 23 and produce no bending stresses in the post 25. In fact it is an essential part of the construction shown that none of the major stresses on the tower, such, for example, as those due to the conductors 1, 2, 3, shall produce bending moments in the posts, which otherwise would be of excessive weight. However, the longitudinal wind stresses on the top of the crossarm 4 due to longitudinal wind are taken up by the stiffness of the posts 5 and 6 as seen from Fig. 2.

It is assumed in Fig. 1 that the conductors may all be blown to a position 45 deg. from the horizontal under the most severe wind conditions. If the conductor clearance to the tower members to be maintained is a particular value with the horizontal crossarm position as on level ground, the extensions 14 and 15 carrying the guys 9 and 10 will be as shown. As the crossarm 4 takes an inclination with the horizontal due to the slope of the ground, however, these clearances change slightly, becoming somewhat less on the down hill side of the tower. This is not enough to be objectionable on any such slope as shown. Of course, any desired clearance may be secured. This statement about the change of clearance with the change of the angle of the cross arm is based on the assumption that the guys 9 and 10 remain of the same length for all crossarm angles. Thus guys 11 and 12 are then made of the particular length appropriate for each crossarm angle.

By changing the relative length of the several guys, 9, 10, 11, 12, any reasonable clearances may be secured and various distributions of stress in the various guys may be secured as will be well understood by those skilled in the art. These possibilities result from the use of the equalizer 13 which may be a plate with suitable connections to the several guys or may be a ring or any other construction suitable for acting as a clearing house or equalizer for the stresses due to the four guys connected thereto.

I prefer to shape the equalizer plate 13 in such a manner that should an energized conductor fall through a broken insulator and slide along the guy, it would finally lodge on the plate 13, at the point 28, for example, Fig. 9, where the burning from an arc would do no harm. This result is accomplished in Fig. 9, which shows the equalized plate 13 and the guy 9, by causing the guy 9 or the shackle 52 connecting it, to cover the approach point 51 of the plate 13 so that the sliding conductor here shown as 1 cannot lodge until it reaches the low point 28.

The advanges of the introduction of the overhangs 14 and 15 on the cross arm 4 for securing the transverse guys, include the fact that the stresses due to the bending moment of these guys are taken up by the crossarm 4 which is a strong member well able to support them, especially since the stress on the guy works against the weight of the conductors and therefore, adds little or nothing to the resultant stresses in the crossarm members. If the guys 9 or 10 be attached to an intermediate point of a post, a very material increase in the weight of the post will result.

In Fig. 1ª, I show diagrammatically the use of a post of greater height under one side of the crossarm than that under the other; this permitting a less inclination of the cross arm 4. In some cases this method of caring for the slope of the ground may be preferable to that of Fig. 1. The transverse guys may be laid out on the same principle as in Fig. 1. If the guys 9ª and 10ª are of equal length and of the same length as on level ground, the guys 11ª and 12ª will be of unequal length.

Figure 2:
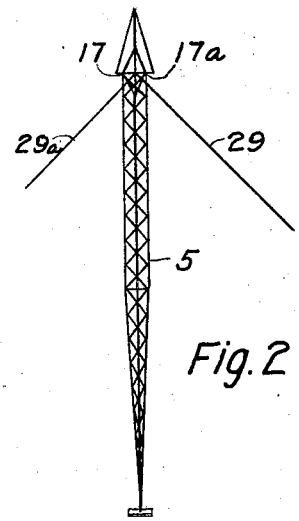
Figure 1A:
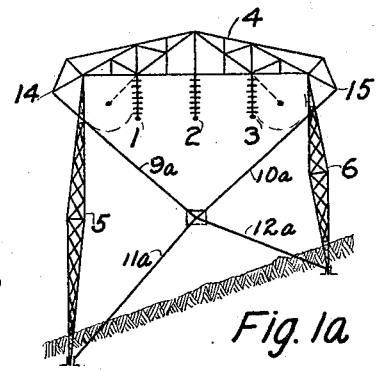

In Fig. 2, I show a sectional end view of Fig. 1 in which similar parts are similarly numbered. 29 and 29ª are longitudinal guys for the post 5 taking up longitudinal horizontal stresses and attached to the end of the crossarm at the top of the post 5, similarly with the post 6 and appropriate guys.

Figure 3:
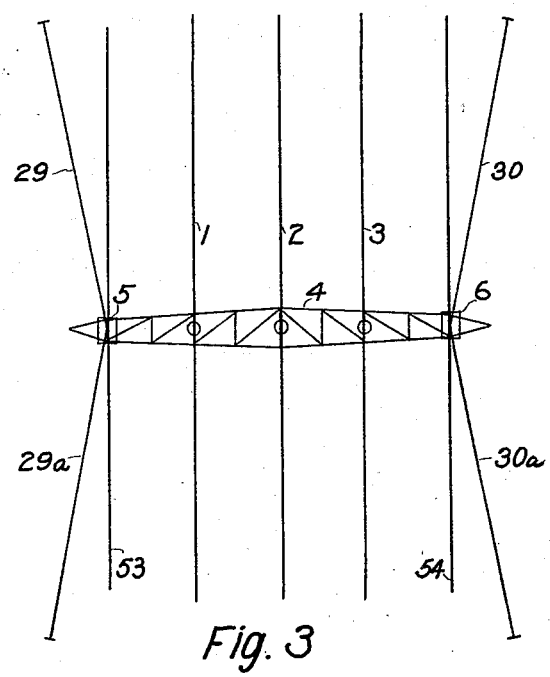

Fig. 3 is a plan view of the tower of Fig. 1 and shows the crossarm 4 and the conductors 1, 2, 3. The posts are shown in plan at 5 and 6 but the details are omitted for clearness. The guys 29, 29ᵃ, 30 and 30ᵃ take up the longitudinal stresses on the tower. They are preferably attached to the top of the posts or to the crossarm at the point where the tops of the posts are attached. This will prevent the pull of the longitudinal guys producing any bending moment in the posts. All the guys will, however, produce an axial pull downward on the post, which are stresses which this post is designed to take.

The guys 29, 29ᵃ, and 30, 30ᵃ, are not placed to pull exactly opposite but at a slight angle from the center of the crossarm. The purpose of this angularity is to secure a certain restraint of the crossarm transversely in case of the breaking of a transverse guy as 9 or 10, Fig. 1. While the longitudinal guys are not intended in Fig. 3 to support the maximum transverse stress, without the aid of the transverse guys of Fig. 1, they can be made nevertheless to support a very material proportion of the total transverse stress. By proper design, however, the transverse guys 9, 10, 11 and 12 may be omitted and all transverse stress taken by the transverse components of the pull of the longitudinal guys. In this case unsymmetrical longitudinal pulls on the guys, as for example, in case a conductor should break will cause a certain amount of horizontal transverse motion in the crossarm due to the redistribution of forces. This will cause no harm, on account of the flexibility of the crossarm conections to the posts. It should be stated that the lower end of the towers at the foundation must be so laid out that none of the contemplated movements of the crossarm will throw material bending moment into the posts due to the resistance of the ground. Suitable constructions are shown hereinafter.

I show at 53 and 54 two overhead ground wires added as an additional mechanical safeguard and as a protection against lightning. As these ground wires are attached at the tops of the posts no bending moments are introduced. Other ground wires may be added to the crossarm, preferably in the plane of the post tops to prevent bending moment in the posts but the point of attachment of the ground wires may be raised provided the posts are made strong enough to carry the bending moments introduced. The longitudinal guys may be omitted and reliance placed upon the ground wires if desired. This would be helpful in crossing cultivated fields.

The type of tower shown herein is advantageous not only because of its adjustability to various site conditions but because of the small stresses on guys and posts due to its special layout. The usual type of tower, as is well known and as described in my application above referred to, is a tall rigid structure on a relatively narrow four legged base, the result being compression and uplift stresses in the main legs far in excess of the magnitude of the stresses actually acting on the tower, through the conductors or otherwise. In the tower of Figs. 1 and 3, for example, the compression stress and uplift on the posts is relatively very small, the latter much less than the compression stress. The stress on the longitudinal guys is much less than the stress in the main legs with the standard type of tower.

It may be noted that should the longitudinal guys, all or any part of them, be broken, the tower would still stand, except under the most extreme conditions on account of the restraining force of the line conductors and the adjoining towers.

In Fig. 6 I show one suitable foundation for the posts of my tower. This comprises a tripod 35, with three legs 35ᵃ, 35ᵇ and 35ᶜ fastened to a suitable bearing base 36, here shown as two angles 36ᵃ and 36ᵇ in T formation, 36ᵇ having the flange clipped at one end so that it may be bolted to the horizontal flange of the other. The upper ends of the three legs 35ᵃ, 35ᵇ and 35ᶜ are traversed by a bolt 37, which carries the load of the post 38. I may in some cases add a triple brace 39 part way up the legs of the tripod to stiffen them. In other cases I prefer to omit this brace as this allows a little more flexibility in the post and the legs are sufficiently restrained by the earth about them, for the normal ground line is in the neighborhood of the top of the tripod, for example, as shown at 40. The braces 39 will act as a ground shear plate. A hole 41 is provided in the base angle 36ᵇ for attaching the transverse guy to this post base, this guy being as shown in Fig. 1. By locating this hole at the center of gravity of the foundation, any tendency to upset the foundation will be avoided. By placing the leg 36ᵃ on the outside of the post 38, a clear space is provided for the guy attached at the point 41 to clear the tripod.

In Figs. 6 and 7 I have shown the connection between the bottom of the post 38 and the tripod as including two Z bars 42ᵃ and 42ᵇ. Their upper flanges are riveted to the lower ends of the corner angles of the post 38, the middle web rests horizontally under the ends of the post, which are preferably trued to fit accurately and the lower flanges receive the bolt 37 and are interlaced between the tops of the three legs of the tripod. The lower flanges and the tripod leg tops should preferably be clamped close together without large spacing blocks in which case complete flexibility of the lower end of the post is secured, in one direction in virtue of the hinge furnished by the bolt and at right angles by the flexibility of the Z bars.

I prefer to stiffen the lower end of the post 38 by plates 43 bolted to the lower ends of the corner angles. I have shown a special form of latticing on the post 38, well adapted to a light low weight column, such as this post. It is adapted as well to other uses. The lattice braces as shown are alternately on the outside and the inside of the angles, this giving an intimate contact between both braces and the angle. I may use flat bars or angles for the bracing as is well known in the art. The points of attachment of the braces on the side faces of the post 38, shown in Fig. 7, occur at points intermediate between the points of attachment of the braces in the front and back faces, shown in Fig. 6. By this plan the advantage is secured that the length of each corner angle between two connections in the same face, which may be taken as acting as a column, is forced by the connection of the brace lying in the other faces to yield, not on its least radius of gyration, but against the depth of a flange which greatly increases its stiffness.

I prefer to keep the length of the braces and the panels in the post 38 as near even as possible. To accomplish this, it is necessary on account of the taper of the corner angles of the post, to use different angles for the various braces. It will usually be necessary, however, to use several lengths of brace on a post on account of the variations of post width. The post should be supplied with the appropriate diagonal bracing in the middle section and at other sections if necessary.

In Fig. 8, I show a different foundation consisting of four angles, 44$^a$, 44$^b$, 44$^c$, 44$^d$, bolted to and forming extensions of the four corner angles of the post 38. These four angles are connected in pairs at the bottom, 44$^a$ with 44$^b$, and 44$^c$ with 44$^d$, by pairs of plates 45$^a$, 45$^b$ and 45$^c$, 45$^d$, inside and outside, bolted or riveted. There is no connection as shown between the two pairs of angles and plates, although additional connecting plates might be added if necessary, as shown by the plates 43 in Fig. 7. The construction shown gives added flexibility in the plane at right angles to the plates flexibility being given in planes at right angles by the bolt 49. The four plates are engaged below the leg angles 44$^a$, 44$^b$, 44$^c$, 44$^d$ by a special bolt 46 which also engages the vertical flanges of the foundation angles 47$^a$, 47$^b$. A spacing block 48 may be used to prevent interference of the flanges of the leg angles and to give a better bearing on the earth.

The bolt 46 has a heavy shoulder and eye on one end to take the transverse guy connection as shown at 49. I prefer to stiffen the lower end of the post 38 by plates 50 in all faces at the point where the leg angles 44$^a$, 44$^b$, 44$^c$, 44$^d$ are connected.

The type of foundation in Fig. 8 has many advantages. It offers material flexibility below the plates 50 to permit movement of the crossarm 4 without introducing bending stresses, especially in view of the slight local yielding of the earth about the leg angles and the fact that they are not cross braced. On the other hand these angles should not fail by side bending on account of the presence of the earth about them. During construction before the filling of earth about the foundation the flexibility is much greater.

Figs. 10 and 11 show in some detail the hinged method of connection between the crossarm 4 and the top of the post. The crossarm members are shown as angles, certain of them being given reference numerals to show the correspondence of parts between the figures. For example 55, 56, 57 and 58 are angles framed into the crossarm and may be proportioned in accordance with the rules of the art. The crossarm member 26$^a$ corresponds to the member 26 but is located on the other side of the crossarm. The members 27, 27 are bracing for the post. The other reference numerals represent the same members as in the other figures. It will be seen that the crossarm 4 is at liberty over a wide range to take any angle with the post in the plane of the paper in Fig. 10, without introducing any bending moment in the post, while a rigid relation is maintained between the crossarm and the post in the plane of the paper in Fig. 11. As shown the longitudinal guys are attached to and exert their stresses on the structure at the level of the insulator attachments on the center line of the crossarm and over the post, this condition serving to eliminate bending stresses in the post and in the crossarm.

While I have shown special details and forms of construction at various points in the figures I wish it understood that I do not limit my invention to these particular features, but contemplate the use of other constructions shown in this application or my application above referred to or known in the art, where such use secures the results of my invention in the same manner or by the same means as here shown and described.

I claim as my invention—

1. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and necessary means for taking up longitudinal and transverse load stresses on said crossarm, foundations under said posts located at unequal elevations, said posts standing substantially vertical.

2. In an electric transmission line traversing country with ground sloping transversely of the line, the combination of a transmission tower, including a rigid cable carrying crossarm extending across the line, duplicate supporting posts thereunder located on both sides of the center, hinge connections between the tops of said posts and said crossarm, permitting relative angular motion between said crossarm and said posts in the plane of the tower and necessary means for taking up longitudinal and transverse load stresses on said crossarm, foundations under said posts located at unequal elevations, said posts standing substantially vertical.

3. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and necessary means for taking up longitudinal and transverse load stresses on said crossarm, foundations under said posts located at unequal elevations, the interior angle between the post and the crossarm in the plane of the tower being less on the uphill side than on the downhill side.

4. In an electric transmission line traversing country with ground sloping transversely of the line, the combination of a transmission tower, including a rigid cable carrying crossarm extending across the line, similar supporting posts thereunder located on both sides of the center, hinge connections between the tops of said posts and said crossarm, permitting relative angular motion between said crossarm and said posts in the plane of the tower and foundations under said posts located at unequal elevations, crossed transverse guys connected to said foundations for taking up transverse load stresses, the guy connected to the lower post foundation being the longer of the crossed guys.

5. In an electric transmission line traversing country with ground sloping transversely of the line, the combination of a transmission tower, including a rigid cable carrying crossarm extending across the line, similar supporting posts thereunder located on both sides of the center, hinge connections between the tops of said posts and said crossarm, permitting relative angular motion between said crossarm and said posts in the plane of the tower and foundations under said posts located at unequal elevations, crossed transverse guys symmetrically located with reference to said foundations for taking up transverse load stresses, the guy connected to the lower post foundation being the longer of the crossed guys.

6. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and necessary means for taking up longitudinal and transverse load stresses on said crossarm, foundations under said posts located at unequal elevations, the interior angle between the post and the slope of the ground in the plane of the tower being less on the down hill side.

7. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and necessary means for taking up longitudinal and transverse load stresses on said crossarm, foundations under said posts located at unequal elevations, said posts being displaced in a vertical plane from the symmetrical position normal on level ground in an uphill direction.

8. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and necessary means for taking up longitudinal and transverse load stresses on said crossarm, foundations under said posts located at unequal elevations, the interior angle between the post and the slope of the ground in the plane of the tower being greater on the uphill side.

9. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and necessary means for taking up longitudinal and transverse load stresses on said crossarm, foundations under said posts located at unequal elevations, the downhill post being inclined in the vertical plane to the uphill side of the vertical.

10. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and necessary means for taking up longitudinal and transverse load stresses on said crossarm, foundations under said posts located at unequal elevations, the interior angle between the post and the crossarm in the plane of the tower being less on the uphill side than on the downhill side by an amount dependent upon the slope of the ground.

11. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and necessary means for taking up longitudinal and transverse load stresses on said crossarm, foundations under said posts located at unequal elevations, the interior angle between the post and the ground slope in the plane of the tower being less on the downhill side than on the uphill side by an amount dependent upon the slope of the ground.

12. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and foundations under said post located at unequal elevations, crossed transverse guys connected to said foundations for taking up transverse load stresses, an equalizer at the point of crossing of said guys, moving this crossing point uphill, whereby normal clearances to the conductors from the guys is maintained.

13. In an electric transmission line traversing country with ground sloping transversely of the line, the combination of a transmission tower, including a rigid cable carrying crossarm extending across the line, supporting posts thereunder located on both sides of the center, hinge connections between the tops of said posts and said crossarm, permitting relative angular motion between said crossarm and said posts in the plane of the tower and foundations under said posts located at unequal elevations, crossed transverse guys connected to said foundations for taking up transverse load stresses, an equalizer at the point of crossing of said guys, the portions of the guys above the equalizer being symmetrical with regard to the crossarm and those below the equalizer unsymmetrical.

Signed at New York in the county of New York and State of New York this 30th day of October, A. D. 1925.

PERCY H. THOMAS.